US010781813B2

(12) United States Patent
Assad et al.

(10) Patent No.: US 10,781,813 B2
(45) Date of Patent: Sep. 22, 2020

(54) CONTROLLER FOR A ROD PUMPING UNIT AND METHOD OF OPERATION

(71) Applicant: General Electric Company, Schenectady, NY (US)

(72) Inventors: Omar Al Assad, Niskayuna, NY (US); Shyam Sivaramakrishnan, Schenectady, NY (US); Kalpesh Singal, Glenville, NY (US); Justin Edwin Barton, Glenville, NY (US)

(73) Assignee: Baker Hughes Oilfield Operations, LLC, Houston, TX (US)

( * ) Notice: Subject to any disclaimer, the term of this patent is extended or adjusted under 35 U.S.C. 154(b) by 602 days.

(21) Appl. No.: 14/965,484

(22) Filed: Dec. 10, 2015

(65) Prior Publication Data

US 2017/0167482 A1    Jun. 15, 2017

(51) Int. Cl.
| | |
|---|---|
| *G01V 1/40* | (2006.01) |
| *F04B 51/00* | (2006.01) |
| *E21B 47/00* | (2012.01) |
| *F04B 19/22* | (2006.01) |
| *F04B 47/02* | (2006.01) |

(Continued)

(52) U.S. Cl.
CPC .......... *F04B 51/00* (2013.01); *E21B 47/0008* (2013.01); *F04B 19/22* (2013.01); *F04B 47/02* (2013.01); *F04B 47/022* (2013.01); *F04B 49/065* (2013.01); *F04B 49/20* (2013.01); *G01L 25/00* (2013.01); *F04B 2201/0201* (2013.01); *F04B 2207/01* (2013.01)

(58) Field of Classification Search
CPC .. F04B 47/02; F04B 49/065; F04B 2201/121; F04B 2201/0201; F04B 19/22; E21B 43/127; E21B 47/0008

USPC ........ 73/152.61; 702/6, 142, 183, 187, 189; 700/31, 282; 166/250.01
See application file for complete search history.

(56) References Cited

U.S. PATENT DOCUMENTS

| | | | |
|---|---|---|---|
| 3,343,409 A | 9/1967 | Gibbs | |
| 5,252,031 A * | 10/1993 | Gibbs | ................. E21B 47/0006 417/18 |

(Continued)

FOREIGN PATENT DOCUMENTS

WO    2013085637 A1    6/2013

OTHER PUBLICATIONS

De Souza et al., "Using artificial neural networks for pattern recognition of downhole dynamometer card in oil rod pump system"; Proceedings of the 8th WSEAS International Conference on Ariificial Intelligence, Knowledge Engineering & Data Bases (AIKED '09); ISBN: 978-960-474-051-2; pp. 230-235.

(Continued)

*Primary Examiner* — John E Breene
*Assistant Examiner* — Jeffrey P Aiello

(57) ABSTRACT

A controller for operating a rod pumping unit includes a processor configured to operate the rod pumping unit at a pumping profile speed. The processor is further configured to compute a first downhole dynamometer card from surface measurements at the rod pumping unit. The processor is further configured to compute a second downhole dynamometer card from the surface measurements. The processor is further configured to validate at least one of the first downhole dynamometer card and the second downhole dynamometer card based on a rod pumping unit condition.

20 Claims, 5 Drawing Sheets

(51) Int. Cl.
*F04B 49/06* (2006.01)
*F04B 49/20* (2006.01)
*G01L 25/00* (2006.01)

(56) References Cited

U.S. PATENT DOCUMENTS

| | | | |
|---|---|---|---|
| 8,036,829 B2 | 10/2011 | Gibbs et al. | |
| 8,336,613 B2 | 12/2012 | Ramsey et al. | |
| 8,849,594 B2 | 9/2014 | Mills | |
| 9,033,676 B2 | 5/2015 | Palka et al. | |
| 9,645,575 B2* | 5/2017 | Watson | G05B 23/0297 |
| 2003/0065447 A1 | 4/2003 | Bramlett et al. | |
| 2004/0062657 A1* | 4/2004 | Beck | E21B 43/126 |
| | | | 417/42 |
| 2010/0111716 A1* | 5/2010 | Gibbs | F04B 49/065 |
| | | | 417/63 |
| 2013/0104645 A1* | 5/2013 | Pons | F04B 49/065 |
| | | | 73/152.61 |
| 2013/0306326 A1* | 11/2013 | Doyle | E21B 43/127 |
| | | | 166/369 |
| 2015/0148919 A1* | 5/2015 | Watson | G06N 7/005 |
| | | | 700/31 |
| 2015/0300156 A1 | 10/2015 | Mills | |
| 2017/0002635 A1* | 1/2017 | Williams | E21B 43/127 |
| 2017/0002805 A1* | 1/2017 | Williams | F04B 49/20 |
| 2017/0030348 A1* | 2/2017 | Mills | E21B 43/121 |
| 2017/0074079 A1* | 3/2017 | Elmer | E21B 43/126 |
| 2017/0235284 A1* | 8/2017 | Watson | G05B 13/041 |
| | | | 700/31 |

OTHER PUBLICATIONS

Everitt et al., "An Improved Finite-Difference Calculation of Downhole Dynamometer Cards for Sucker-Rod Pumps", SPE Production Engineering, Feb. 1992, pp. 121-127.

Romero et al., "Numerical simulation of the sucker-rod pumping system", Ingeniería E Investigación vol. 34 No. 3, Dec. 2014; pp. 4-11.

International Search Report and Written Opinion issued in connection with corresponding PCT Application No. PCT/US2016/65966 dated Mar. 16, 2017.

* cited by examiner

CONTROLLER FOR A ROD PUMPING UNIT AND METHOD OF OPERATION

BACKGROUND

The field of the disclosure relates generally to rod pumping units and, more particularly, to a rod pumping unit controller and method of operation for computing a downhole dynamometer card for a rod pumping unit.

Most known rod pumping units (also known as surface pumping units) are used in wells to induce fluid flow, for example oil and water. Examples of rod pumping units include, for example, and without limitation, linear pumping units and beam pumping units. Rod pumping units convert rotating motion from a prime mover, e.g., an engine or an electric motor, into reciprocating motion above the well head. This motion is in turn used to drive a reciprocating downhole pump via connection through a sucker rod string. The sucker rod string, which can extend miles in length, transmits the reciprocating motion from the well head at the surface to a subterranean piston, or plunger, and valves in a fluid bearing zone of the well. The reciprocating motion of the piston valves induces the fluid to flow up the length of the sucker rod string to the well head.

The rod pumping units are exposed to a wide range of conditions. These vary by well application, the type and proportions of the pumping unit's linkage mechanism, and the conditions of the well. Furthermore, well conditions, such as downhole pressure, may change over time. These conditions may cause variability in the flow of the fluid.

The rod pumping unit imparts continually varying motion on the sucker rod string. The sucker rod string responds to the varying load conditions from the surface unit, down-hole pump, and surrounding environment by altering its own motion statically and dynamically. The sucker rod string stretches and retracts as it builds the force necessary to move the down-hole pump and fluid. The rod pumping unit, breaking away from the effects of friction and overcoming fluidic resistance and inertia, tends to generate counter-reactive interaction force to the sucker rod string exciting the dynamic modes of the sucker rod string, which causes an oscillatory response. Traveling stress waves from multiple sources interfere with each other along the sucker rod string (some constructively, others destructively) as they traverse its length and reflect load variations back to the rod pumping unit, where they can be measured. Measurements of the position and load of the rod pumping unit at the surface are referred to as a surface dynamometer card, or a surface card.

Generally, the surface measurements are used in diagnostic analysis to determine downhole position and load. The relationship between surface measurements and downhole measurements is represented, for example, and without limitation, by a model of the sucker rod string referred to as the wave equation, which models the propagation of waves in a continuous medium as a one-dimensional partial differential equation. Solutions to the wave equation generally yield a displacement of a point on the sucker rod string at a given time. Translating the surface measurements to downhole measurements by solving the wave equation is computationally intensive and can be done using techniques such as, for example, and without limitation, a Fourier Series technique, a Finite Difference technique, and an ordinary differential equation technique. The downhole measurements are referred to as a downhole dynamometer card, or pump card.

Downhole dynamometer cards computed using various techniques produce varying results based on conditions at the rod pumping unit and downhole at the pump. Many known rod pumping unit controllers utilize a technique best suited for that particular rod pumping unit. Inaccuracies in the downhole dynamometer card may result in inefficient operation of the rod pumping unit and delayed diagnostic feedback.

BRIEF DESCRIPTION

In one aspect, a controller for operating a rod pumping unit is provided. The controller includes a processor configured operate the rod pumping unit at a pumping speed profile. The processor is further configured to compute a first downhole dynamometer card from surface measurements at the rod pumping unit. The processor is also configured to compute a second downhole dynamometer card from the surface measurements. The processor is further configured to validate at least one of the first downhole dynamometer card and the second downhole dynamometer card based on a rod pumping unit condition.

In another aspect, a method of operating a controller for a rod pumping unit is provided. The method includes operating the rod pumping unit at a pumping speed profile. The method further includes receiving surface measurements of rod pumping unit position and load for a pump stroke. The method also includes computing a first downhole dynamometer card from the surface measurements using a first technique. The method further includes computing a second downhole dynamometer card from the surface measurements using a second technique. The method also includes determining the first downhole dynamometer card is inaccurate based on a rod pumping unit condition. The method further includes designating the second downhole dynamometer card as accurate.

In yet another aspect, a control system for a rod pumping unit having a polished rod coupled to a pump by a sucker rod string. The control system includes a position sensor, a load sensor, and a controller. The position sensor is configured to measure a surface position of the polished rod and generate a position signal. The load sensor is configured to measure a surface load on the polished rod and generate a load signal. The controller is coupled to the position sensor and the load sensor. The controller is configured to receive the position signal for a current stroke. The controller is also configured to receive the load signal for the current stroke. The controller is further configured to compute a first downhole dynamometer card from the current surface position and the current load. The controller is also configured to compute a second downhole dynamometer card from the current surface position and the current load. The controller is further configured to validate at least one of the first downhole dynamometer card and the second downhole dynamometer card based on a rod pumping unit condition.

DRAWINGS

These and other features, aspects, and advantages of the present disclosure will become better understood when the following detailed description is read with reference to the accompanying drawings in which like characters represent like parts throughout the drawings, wherein.

Figure 1:
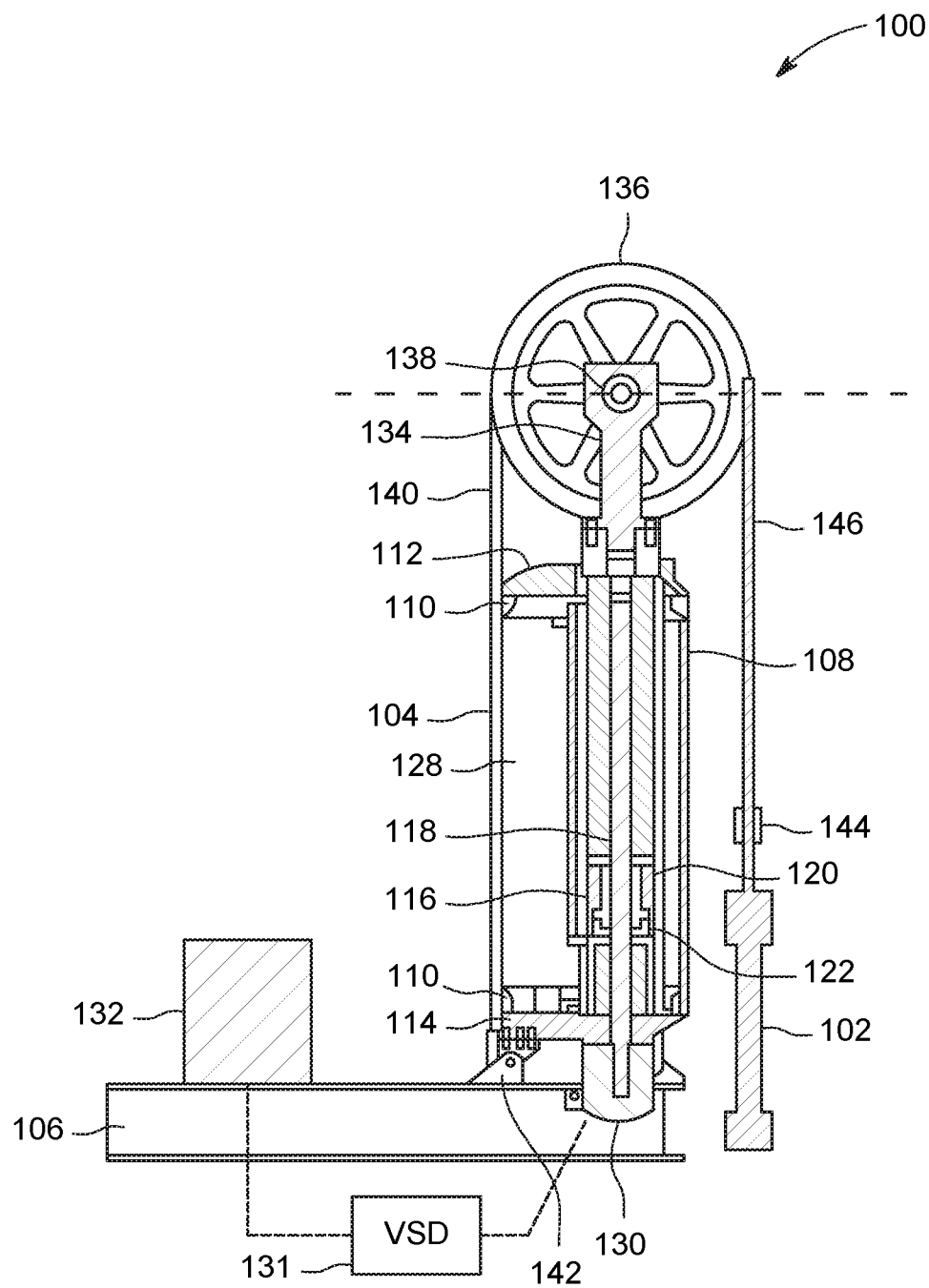
FIG. 1 is a cross-sectional view of an exemplary rod pumping unit in a fully retracted position.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the present disclosure relate to a controller for a rod pumping unit. The controllers described herein provide multiple downhole dynamometer cards using various computation techniques. The controllers then evaluate rod pumping unit conditions to determine if the computed downhole dynamometer cards are valid. Valid downhole dynamometer cards are designated accurate, while invalid downhole dynamometer cards are designated uncertain or inaccurate for use in diagnostics or control. For the controllers described herein, rod pumping unit conditions that impact the accuracy of certain techniques for computing downhole dynamometer cards include changes in pump speed and variations in downhole dynamometer cards from stroke to stroke. When the controller detects such conditions exceeding predetermined thresholds, the controller designates certain downhole dynamometer cards as inaccurate and uses one or more others for diagnostics or control.

Figure 2:
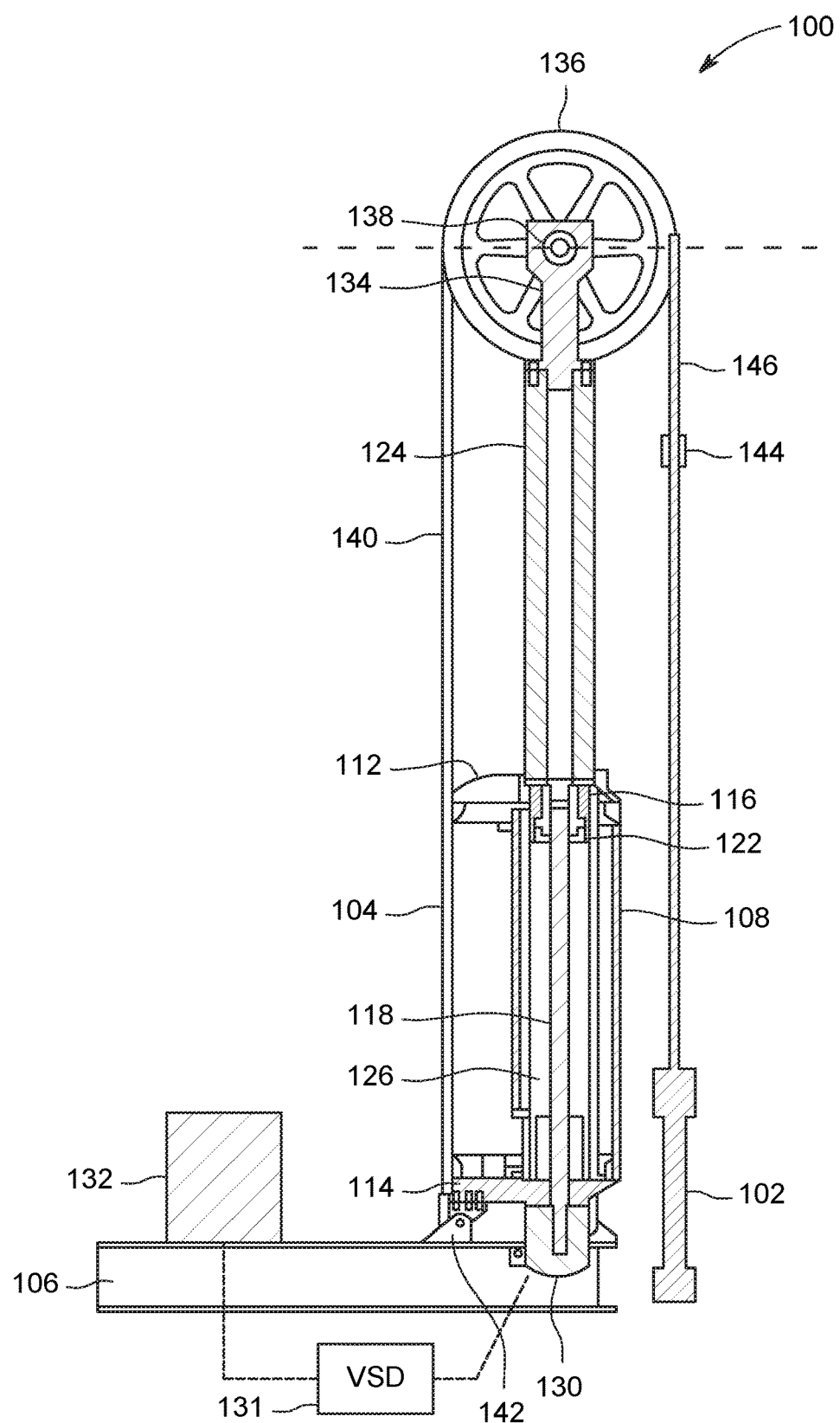
FIG. 2 is a cross-sectional view of the rod pumping unit shown in FIG. 1 in a fully extended position.

FIGS. 1 and 2 are cross-sectional views of an exemplary rod pumping unit 100 in fully retracted (1) and fully extended (2) positions, respectively. In the exemplary embodiment, rod pumping unit 100 (also known as a linear pumping unit) is a vertically oriented rod pumping unit having a linear motion vertical vector situated adjacent to a well head 102. Rod pumping unit 100 is configured to transfer vertical linear motion into a subterranean well (not shown) through a sucker rod string (not shown) for inducing the flow of a fluid. Rod pumping unit 100 includes a pressure vessel 104 coupled to a mounting base structure 106. In some embodiments, mounting base structure 106 is anchored to a stable foundation situated adjacent to the fluid-producing subterranean well. Pressure vessel 104 may be composed of a cylindrical or other appropriately shaped shell body 108 constructed of formed plate and cast or machined end flanges 110. Attached to the end flanges 110 are upper and lower pressure heads 112 and 114, respectively.

Penetrating upper and lower pressure vessel heads 112 and 114, respectively, is a linear actuator assembly 116. This linear actuator assembly 116 is includes a vertically oriented threaded screw 118 (also known as a roller screw), a planetary roller nut 120 (also known as a roller screw nut assembly), a forcer ram 122 in a forcer ram tube 124, and a guide tube 126.

Roller screw 118 is mounted to an interior surface 128 of lower pressure vessel head 114 and extends up to upper pressure vessel head 112. The shaft extension of roller screw 118 continues below lower pressure vessel head 114 to connect with a compression coupling (not shown) of a motor 130. Motor 130 is coupled to a variable speed drive (VSD) 131 configured such that the motor's 130 rotating speed may be adjusted continuously. VSD 131 also reverses the motor's 130 direction of rotation so that its range of torque and speed may be effectively doubled. Roller screw 118 is operated in the clockwise direction for the upstroke and the counter-clockwise direction for the downstroke. Motor 130 is in communication with a rod pumping unit controller 132. In the exemplary embodiment, pumping unit controller 132 transmits commands to motor 130 and VSD 131 to control the speed, direction, and torque of roller screw 118.

Within pressure vessel 104, the threaded portion of roller screw 118 is interfaced with planetary roller screw nut assembly 120. Nut assembly 120 is fixedly attached to the lower segment of forcer ram 122 such that as roller screw 118 rotates in the clockwise direction, forcer ram 122 moves upward. Upon counterclockwise rotation of roller screw 118, forcer ram 122 moves downward. This is shown generally in FIGS. 1 and 2. Guide tube 126 is situated coaxially surrounding forcer tube 124 and statically mounted to lower pressure head 114. Guide tube 126 extends upward through shell body 108 to slide into upper pressure vessel head 112.

An upper ram 134 and a wireline drum assembly 136 and fixedly coupled and sealed to the upper end of forcer ram 122. Wireline drum assembly 136 includes an axle 138 that passes laterally through the top section of the upper ram 134. A wireline 140 passes over wireline drum assembly 136 resting in grooves machined into the outside diameter of wireline drum assembly 136. Wireline 140 is coupled to anchors 142 on the mounting base structure 106 at the side of pressure vessel 104 opposite of well head 102. At the well head side of pressure vessel 104, wireline 140 is coupled to a carrier bar 144 which is in turn coupled to a polished rod 146 extending from well head 102.

Rod pumping unit 100 transmits linear force and motion through planetary roller screw nut assembly 120. Motor 130 is coupled to the rotating element of planetary roller screw nut assembly 120. By rotation in either the clockwise or counterclockwise direction, motor 130 may affect translatory movement of planetary roller nut 120 (and by connection, of forcer ram 122) along the length of roller screw 118.

Figure 3:
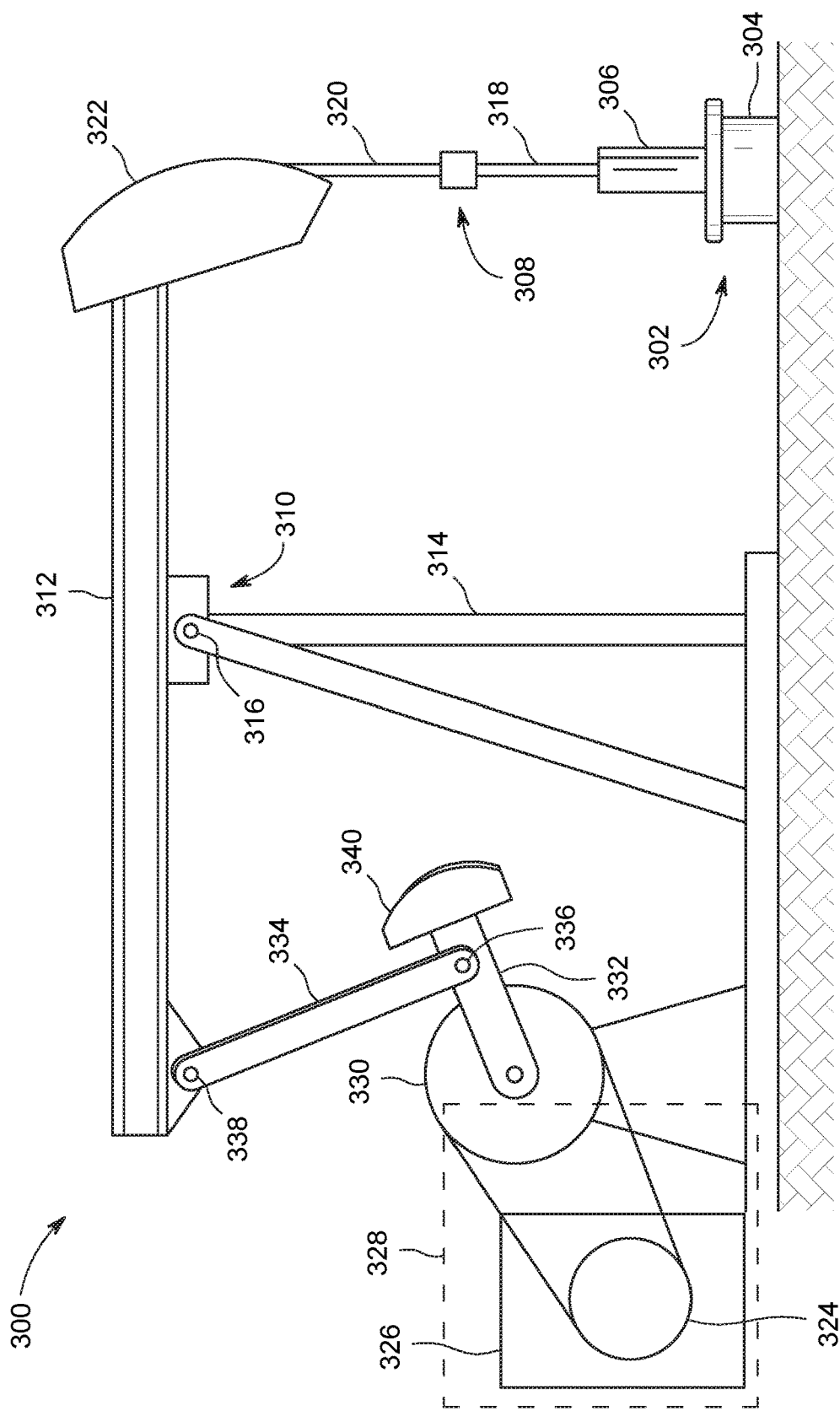
FIG. 3 is a diagram of an exemplary beam-type rod pumping unit.

FIG. 3 is a diagram of an exemplary beam-type rod pumping unit, beam pumping unit 300 for use at a well head 302 of a well that extends beneath the surface for the purpose of producing gas and fluid from a well. Well head 302 includes an upper portion of a casing 304 and tubing 306. Casing 304 and tubing 306 extend into the well to facilitate a downhole pump, such as pump 302 (shown in FIG. 3), that is actuated by a rod 308 to produce the gas and fluid.

Beam pumping unit 300 includes a surface support unit 310 that suspends rod 308 in the well. Surface support unit 310 includes a walking beam 312 pivotally coupled to a Samson post 314 by a pin 316. Rod 308 includes polished rod 318 that extends into casing 304 and tubing 306 through well head 302. Rod 308 also includes a cable 320 that flexibly couples rod 308 to walking beam 312 at a horsehead 322.

Beam pumping unit 300 is driven by a motor 324 through a gear box 326. Together, motor 324 and gear box 326 form a drive system 328 that, in certain embodiments, may include one or more belts, cranks, or other components. Through gear box 326, motor 324 turns a crank 330 having a crank arm 332. Crank arm 332 is coupled to walking beam 312 at an end opposite horsehead 322 by a pitman arm 334. Pitman arm 334 pivotably couples to crank arm 332 by a pin 336, and further pivotably couples to walking beam 312 by a pin 338. Pitman arm 334 is configured to translate angular motion of crank arm 332 into linear motion of walking beam 312. The linear motion of walking beam 312 provides the reciprocal motion of rod 308 for operating the downhole pump.

On an upstroke of beam pumping unit 300, the weight of rod 308, which is suspended from walking beam 312, is transferred to crank 330 and drive system 328. Crank arm 332 includes a counterweight 340 that is configured to reduce the load on drive system 328 during an upstroke.

Figure 4:
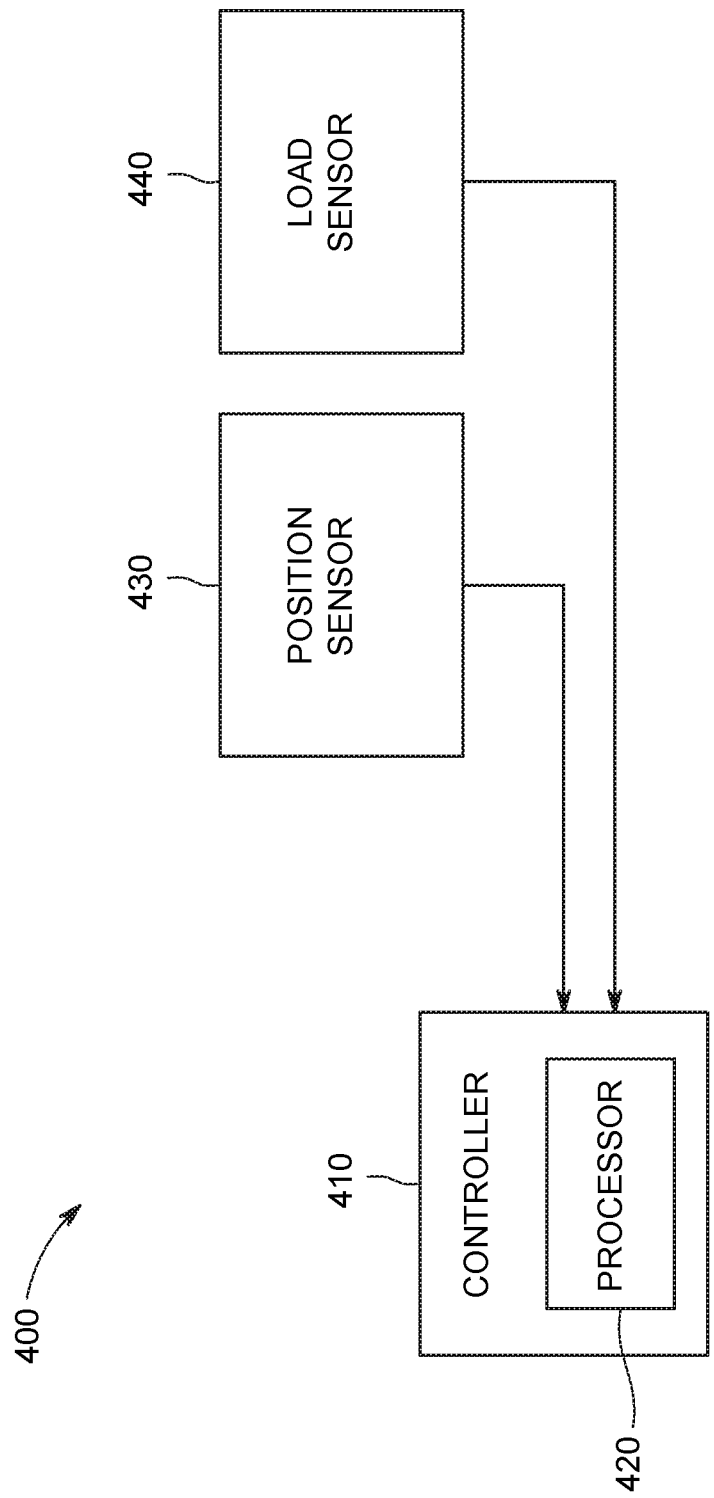
FIG. 4 is a block diagram of control system for the rod pumping units shown in FIGS. 1, 2, and 3.

FIG. 4 is a block diagram of a control system 400 for use with rod pumping unit 100 (shown in FIGS. 1 and 2) or beam pumping unit 300 (shown in FIG. 3). Control system 400 includes a controller 410 having a processor 420. Control system 400 further includes a position sensor 430 and a load sensor 440 disposed at the surface and configured to measure the surface position and surface load on the polished rod, such as polished rod 146 (shown in FIGS. 1 and 2) or polished rod 318 (shown in FIG. 3). The surface measurements of position and load are related to downhole position of a pump (not shown) and a downhole load on the pump, which is referred to as the downhole dynamometer card, or pump card.

During operation of rod pumping unit 100 or beam pumping unit 300, processor 420 is configured to receive a position signal from position sensor 430 and a load signal from load sensor 440. Processor 420 computes a downhole dynamometer card. Several techniques are available for computing the downhole dynamometer card, including, for example, and without limitation, a Fourier series technique and Finite Difference technique.

In certain embodiments, a downhole dynamometer card is computed by solving the wave equation, Eq. 1, to find a displacement, u, of a point, x, on the sucker rod string at a given time, t. Given that displacement, the downhole load is computed using Hooke's Law, which generally governs extension and compression of a spring.

$$\frac{\partial^2 u}{\partial t^2}(x, t) = a^2 \frac{\partial^2 u}{\partial x^2}(x, t) - c \frac{\partial u}{\partial t}(x, t), \qquad \text{(Eq. 1)}$$

where c is a damping factor, and a is the acoustic velocity in the sucker rod string.

Generally, the wave equation, Eq. 1, is solved using two boundary conditions: the time history of load on the polished rod and the time history of displacement, or position, of the polished rod. These boundary conditions are obtained from the surface position and load measurements. Kinematic models for rod pumping unit 100 or beam pumping unit 300, for example, define surface position with respect to time.

Generally, the Fourier series technique is used to compute a downhole dynamometer card in real-time. In the Fourier series technique, the wave equation, Eq. 1, is solved by a Fourier series approximation. The Fourier series is truncated to a predetermined number of terms, the coefficients of which are determined for the boundary conditions, i.e., the surface measurements of position and load. The Fourier series, with the coefficients, is then used to compute the downhole displacement at the pump from the steady-state analytical solution of the wave equation. Based on the displacement of the pump, the downhole position and load are computed, i.e., the downhole dynamometer card. It is realized herein the accuracy of the Fourier series approximation for a given pump stroke is reduced with stroke-to-stroke changes in pump speed. The accuracy of the Fourier series approximation for a given pump stroke is reduced with stroke-to-stroke changes in downhole dynamometer values. Such pump conditions are referred to as the periodicity of the pump stroke, which generally implies each consecutive pump stroke is similar to the next.

Generally, the Finite Difference technique solves the wave equation, Eq. 1, by replacing derivative expressions with finite difference quotients to approximate the numerical derivatives. The sucker rod string is represented as a series of nodes from the surface to the pump. The displacement of a given node is computed as a function of the displacement at the two nodes above it, beginning with the surface position measurement and then using the load measurement to calculate the displacement at the second node. Using the Finite Difference approximations, a displacement for each node is computed until a displacement for the pump is reached. Based on the displacement of the pump, the downhole position and load are computed, i.e., the downhole dynamometer card.

Controller 410 designates each downhole dynamometer card as accurate, uncertain, or inaccurate for the purpose of diagnostic analysis or control. In diagnostic analysis, the downhole dynamometer card can indicate various pump conditions, including, for example, a full pump, a flowing well, a bent barrel, fluid friction, gas interference, drag friction, tubing movement, a worn or split barrel, fluid pound, a worn standing valve, and a worn plunger. Inaccuracies in the downhole dynamometer card can lead to inefficient operation of the rod pumping unit and excessive wear on rod pumping unit components.

For a given pump stroke, controller 410 computes at least two downhole dynamometer cards using two or more techniques. Controller 410 then validates the downhole dynamometer cards to determine which is more likely to be accurate. If a first downhole dynamometer card cannot be validated, it is designated inaccurate, or at least uncertain, and a second downhole dynamometer card is relied upon for diagnostics or control of the rod pumping unit.

For example, in one embodiment, controller 410 computes a first downhole dynamometer card using the Fourier Series technique and a second downhole dynamometer card using the Finite Difference technique. The first downhole dynamometer card is available in real-time, while the second downhole dynamometer card is delayed in time. The first, real-time, downhole dynamometer card is accurate so long as the rod pumping unit conditions, such as, for example, pump speed and the downhole dynamometer card, are generally consistent from stroke to stroke. If the rod pumping unit conditions vary beyond a predetermined threshold, the first downhole dynamometer card is not valid and is designated inaccurate. The second downhole dynamometer card is then designated accurate and used for diagnostics or control.

In certain embodiments, controller 410 is configured to compute a third downhole dynamometer card. Controller 410 then compares the first, second, and third downhole dynamometer cards to determine if one or more varies significantly from the others. If the three downhole dynamometer cards are consistent, the real-time downhole dynamometer card computed using the Fourier Series technique is used for diagnostics and control. If one of the three downhole dynamometer cards varies greatly from the others, it is considered an outlier and the two downhole dynamometer cards that are consistent are used, or considered for use in diagnostics or control.

Controller 410 drives rod pumping unit 100 or beam pumping unit 300 according to a pumping speed profile. The pumping speed profile for a pump stroke is represented by a time-average pump speed for a single pump stroke, which is referred to as a pump speed measured in strokes per minute (SPM). The velocity of the pump itself varies throughout the pump stroke. Such variability in velocity is represented by the shape of the pumping speed profile. Pumping speed profiles often assumes, for example, and without limitation, a trapezoid shape when plotted as speed versus position. Controller 410 determines the pump speed based on pump fillage, which is a measure of the fluid level inside the pump barrel. Using a fillage recovery algorithm and the downhole dynamometer card, controller 410 computes the pump speed to maintain the highest pump fillage possible. When pump fillage is high, controller 410 drive the rod pumping unit as quickly as otherwise allowed. When pump fillage is low, controller 410 drives the rod pumping unit more slowly.

Figure 5:
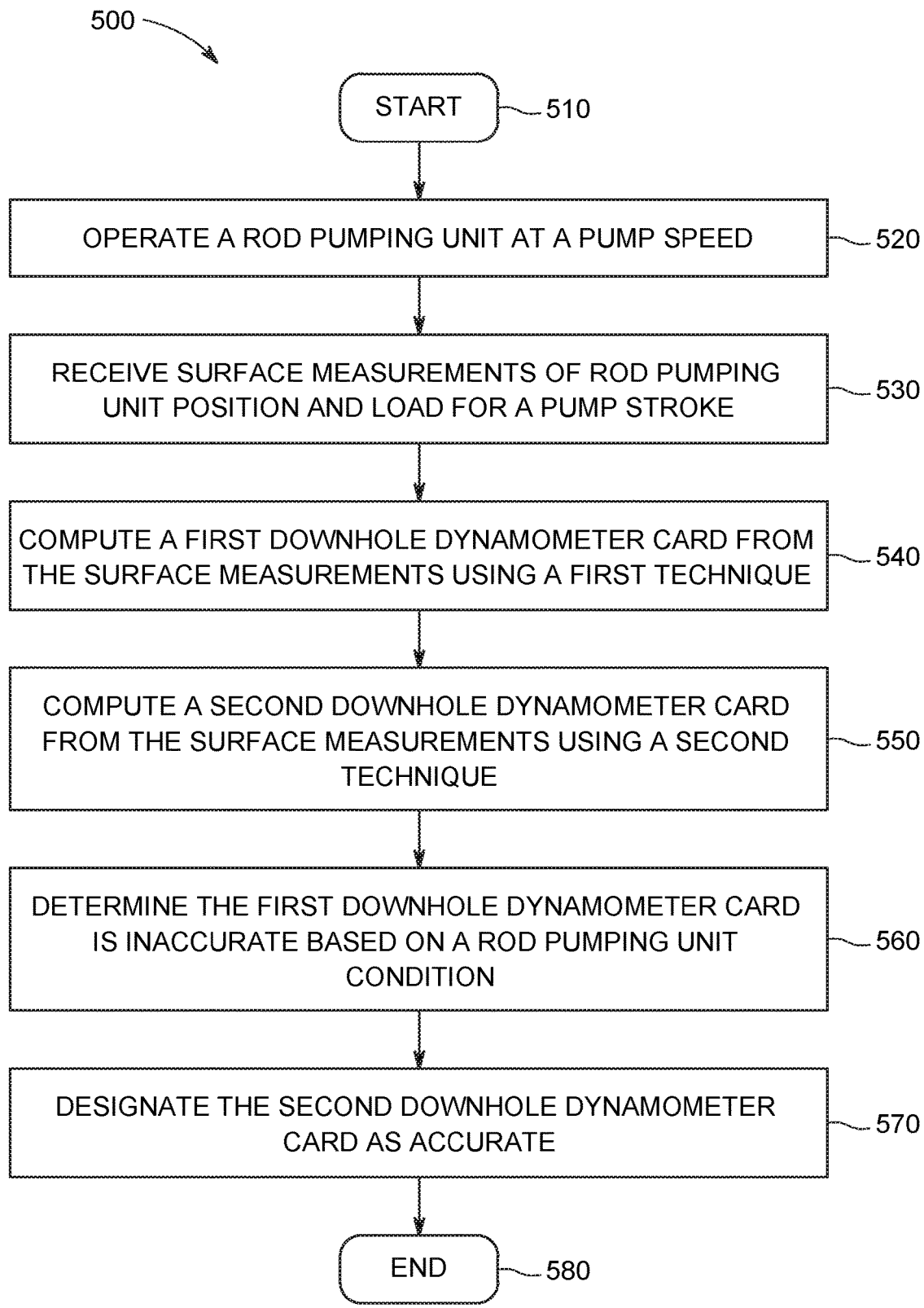
FIG. 5 is a flow diagram of an exemplary method of operating the controller shown in FIG. 4.

FIG. 5 is a flow diagram of an exemplary method 500 of operating controller 410 (shown in FIG. 4). The method begins at a start step 510. At an operating step 520, controller 410 operates rod pumping unit 100 (shown in FIG. 1) at a pumping speed profile. At a surface measurement step 530, surface measurements of rod pumping unit position and load are received at controller 410. The surface measurements are taken for a current pump stroke by position sensor 430 and load sensor 440 (both shown in FIG. 4), which are disposed, for example, at the polished rod for the rod pumping unit. The surface measurements define a surface dynamometer card.

At a first pump card step 540, a first downhole dynamometer card is computed by controller 410 from the surface measurements using a first technique. In certain embodiments, the first technique is a truncated Fourier Series approximation of the analytical wave equation solution representing the sucker rod string for the rod pumping unit. In such an embodiment, the first downhole dynamometer card is a real-time downhole dynamometer card.

At a second pump card step 550, a second downhole dynamometer card is computed by controller 410 from the surface measurements using a second technique. In certain embodiments, the second technique is a finite difference approximation of the wave equation. In such an embodiment, the second downhole dynamometer card is not determined in real-time.

At a pumping conditions step 560, rod pumping unit conditions are evaluated by controller 410 to determine if the first downhole dynamometer card is accurate or inaccurate. The accuracy of the first downhole dynamometer card depends on the first technique by which it was computed. For example, in embodiments where the first technique is the Fourier Series approximation, the accuracy of the downhole dynamometer card relies on the periodicity of certain rod pumping unit conditions, such as, for example, pump speed and the downhole dynamometer card. To evaluate such conditions, controller 410 computes a difference between the current conditions and the conditions for the previous pump stroke. If the difference exceeds a predetermined threshold, the downhole dynamometer card is inaccurate.

For example, controller 410 compares the current pump speed to a previous pump speed for the previous pump stroke. If the difference exceeds a predetermined threshold, 2 SPM, for example, the first downhole dynamometer card is inaccurate. In another example, controller 410 computes a difference between a previous downhole dynamometer card and one or more of the first and second downhole dynamometer cards for the current pump stroke. If the difference in downhole position exceeds a predetermined threshold, 0.25 meters, for example, the first downhole dynamometer card is inaccurate. Likewise, if the difference in downhole load exceeds a predetermined threshold, 900 Newtons, for example, the first downhole dynamometer card is inaccurate. In alternative embodiments, the predetermined thresholds for displacement and load may be different.

The predetermined threshold values are generally computed based on pumping depth, downhole well conditions, and sucker rod structure. Downhole well conditions to be considered include, for example, and without limitation, pump intake pressure and gas fraction. Aspects of sucker rod structure to be considered include, for example, and without limitation, length of tapers, number of tapers, and sucker rod material composition.

In certain embodiments, method 500 includes a third pump card step where a third downhole dynamometer card is computed using a third technique, such as, for example, and without limitation, an ordinary differential equation technique. Controller 410 compares the first, second, and third downhole dynamometer cards to identify outliers. If two of the three downhole dynamometer cards are similar, then the third is designated inaccurate.

At a designation step 570, because the first downhole dynamometer card is deemed inaccurate, the second downhole dynamometer card is designated accurate and is used for diagnostics or for control. Method 500 ends at an end step 580.

The above described controllers for rod pumping units provide multiple downhole dynamometer cards using various computational techniques. The controllers then evaluate rod pumping unit conditions to determine if the computed downhole dynamometer cards are valid. Valid downhole dynamometer cards are designated accurate, while invalid downhole dynamometer cards are designated uncertain or inaccurate for use in diagnostics or control. For the controllers described herein, rod pumping unit conditions that impact the accuracy of certain techniques for compute downhole dynamometer cards include changes in pump speed and variations in downhole dynamometer cards from stroke to stroke. When the controller detects such conditions exceeding predetermined thresholds, the controller designates certain downhole dynamometer cards as inaccurate and uses one or more others for diagnostics or control.

An exemplary technical effect of the methods, systems, and apparatus described herein includes at least one of: (a) computing multiple downhole dynamometer cards for a single pump stroke; (b) validating downhole dynamometer cards based on rod pumping unit conditions; (c) improving accuracy of rod pumping unit diagnostics; (d) improving accuracy of pump fillage estimations; (e) improving accuracy of stress monitoring based on downhole dynamometer cards; and (f) avoiding inefficient and damaging operation of the rod pumping unit.

Exemplary embodiments of methods, systems, and apparatus for rod pumping unit controllers are not limited to the specific embodiments described herein, but rather, components of systems and/or steps of the methods may be utilized independently and separately from other components and/or steps described herein. For example, the methods may also be used in combination with other non-conventional rod pumping unit controllers, and are not limited to practice with only the systems and methods as described herein. Rather, the exemplary embodiment can be implemented and utilized in connection with many other applications, equipment, and systems that may benefit from reduced cost, reduced complexity, commercial availability, improved reliability at high temperatures, and increased memory capacity.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A controller for operating a rod pumping unit, said controller comprising a processor configured to:
   operate the rod pumping unit at a pumping speed profile;
   compute a first downhole dynamometer card from surface measurements at said rod pumping unit;
   compute a second downhole dynamometer card from the surface measurements;
   determine if a difference between a current pumping speed profile for a current pump stroke and a previous pumping speed profile for a previous pump stroke exceeds a predetermined threshold;
   designate the first downhole dynamometer card as accurate if the difference does not exceed the predetermined threshold;
   designate the first downhole dynamometer card as inaccurate if the difference does exceed the predetermined threshold; and replace the first downhole dynamometer card with the second downhole dynamometer card when the first downhole dynamometer card is designated as inaccurate.

2. The controller in accordance with claim 1, wherein said processor is further configured to receive surface position and load measurements for the rod pumping unit for a current stroke.

3. The controller in accordance with claim 1, wherein said processor is further configured to compute the first downhole dynamometer card in real-time using a Fourier Series solution of a wave equation representing a sucker rod string for the rod pumping unit.

4. The controller in accordance with claim 1, wherein said processor is further configured to designate the second downhole dynamometer card as accurate if the first downhole dynamometer card is designated inaccurate.

5. The controller in accordance with claim 1, wherein said processor is further configured to:
compute a difference between a previous downhole dynamometer card for a previous pump stroke and at least one of the first downhole dynamometer card and the second downhole dynamometer card for a current stroke;
designate the first downhole dynamometer card as accurate if the difference does not exceed a predetermined threshold; and
designate the first downhole dynamometer card as inaccurate if the difference exceeds the predetermined threshold.

6. The controller in accordance with claim 1, wherein said processor is further configured to compute the second downhole dynamometer card using a Finite Difference solution to a wave equation representing a sucker rod string of the rod pumping unit for a current stroke.

7. A method of operating controller for a rod pumping unit, said method comprising:
operating the rod pumping unit at a pumping speed profile;
receiving surface measurements of rod pumping unit position and load for a pump stroke;
computing a first downhole dynamometer card from the surface measurements using a first technique;
computing a second downhole dynamometer card from the surface measurements using a second technique;
determining the first downhole dynamometer card is inaccurate based on a rod pumping unit condition, wherein the first downhole dynamometer card is inaccurate if a difference between a current pumping speed profile for a current pump stroke and a previous pumping speed profile for a previous pump stroke exceeds a predetermined threshold;
designating the second downhole dynamometer card as accurate; and
replacing the first downhole dynamometer card with the second downhole dynamometer card.

8. The method in accordance with claim 7, wherein computing the first downhole dynamometer card includes computing a real-time downhole dynamometer card using partial differential equations to solve a wave equation representing a sucker rod string for the rod pumping unit.

9. The method in accordance with claim 8, wherein determining the first downhole dynamometer card is inaccurate comprises:
comparing a current pumping speed profile for the pump stroke to a previous pumping speed profile for a previous stroke; and
designating the first downhole dynamometer card as inaccurate if a difference between the current pumping speed profile and the previous pumping speed profile exceeds a predetermined threshold.

10. The method in accordance with claim 8, wherein determining the first downhole dynamometer card is inaccurate comprises:
computing a difference between a previous downhole dynamometer card for a previous stroke and at least one of the first downhole dynamometer card and the second downhole dynamometer card; and
designating the first downhole dynamometer card as inaccurate if the difference exceeds a predetermined threshold.

11. The method of claim 8 further comprising:
determining the first downhole dynamometer card is accurate based on the rod pumping unit condition being satisfied; and
designating the first downhole dynamometer card as accurate.

12. The method of claim 7 further comprising:
computing a third downhole dynamometer card from the surface measurements using a third technique; and
comparing the first downhole dynamometer card, the second downhole dynamometer card, and the third downhole dynamometer card to validate accuracy of at least two of the first downhole dynamometer card, the second downhole dynamometer card, and the third downhole dynamometer card.

13. The method in accordance with claim 7, wherein computing the second downhole dynamometer card includes computing a finite difference solution to a wave equation representing a sucker rod string for the rod pumping unit.

14. A control system for a rod pumping unit having a polished rod coupled to a pump by a sucker rod string, comprising:
a position sensor configured to measure a surface position of the polished rod and generate a position signal indicative thereof;
a load sensor configured to measure a surface load on the polished rod and generate a load signal indicative thereof; and
a controller coupled to said position sensor and said load sensor, said controller configured to:
receive the position signal indicative of a current surface position for a current stroke;
receive the load signal indicative of a current load for the current stroke;
compute a first downhole dynamometer card from the current surface position and the current load;
compute a second downhole dynamometer card from the current surface position and the current load;
determine if a difference between a current pumping speed profile for a current pump stroke and a previous pumping speed profile for a previous pump stroke exceeds a predetermined threshold:
designate the first downhole dynamometer card as accurate if the difference does not exceed the predetermined threshold:
designate the first downhole dynamometer card as inaccurate if the difference does exceed the predetermined threshold: and
replace the first downhole dynamometer card with the second downhole dynamometer card when the first downhole dynamometer card is designated as inaccurate.

15. The control system in accordance with claim 14, wherein said controller is further configured to compute the first downhole dynamometer card using a truncated Fourier Series approximation of a steady-state analytical wave equation solution representing the sucker rod string.

16. The control system in accordance with claim 14, wherein said controller is further configured to compute the second downhole dynamometer card using a finite difference approximation of a wave equation representing the sucker rod string.

17. The control system in accordance with claim 14, wherein the rod pumping unit condition comprises a current pumping speed profile that varies from a previous pumping speed profile by no more than a predetermined threshold.

18. The control system in accordance with claim 14, wherein the rod pumping unit condition comprises a previous downhole dynamometer card varying from at least one of the first downhole dynamometer card and the second downhole dynamometer card by no more than a predetermined threshold.

19. The control system in accordance with claim 18, wherein the predetermined threshold is defined as plus-or-minus 0.25 meters.

20. The control system in accordance with claim 18, wherein the predetermined threshold is computed based on at least one of a pumping depth, a downhole well condition, and a structure of the sucker rod string.

* * * * *